(12) United States Patent
Lee (10) Patent No.: US 12,326,419 B2
(45) Date of Patent: Jun. 10, 2025

(54) MAGNETIC PARTICLE TESTING FOR AN AXLE OF AN AIRCRAFT LANDING GEAR

(71) Applicant: GOODRICH CORPORATION, Charlotte, NC (US)

(72) Inventor: Seokwon Lee, Hamilton (CA)

(73) Assignee: GOODRICH CORPORATION, Charlotte, NC (US)

( * ) Notice: Subject to any disclaimer, the term of this patent is extended or adjusted under 35 U.S.C. 154(b) by 141 days.

(21) Appl. No.: 18/299,585

(22) Filed: Apr. 12, 2023

(65) Prior Publication Data
US 2024/0345027 A1    Oct. 17, 2024

(51) Int. Cl.
*G01N 27/84* (2006.01)

(52) U.S. Cl.
CPC ..................... *G01N 27/84* (2013.01)

(58) Field of Classification Search
None
See application file for complete search history.

(56) References Cited

U.S. PATENT DOCUMENTS

| 5,534,775 | A * | 7/1996 | Lam | G01N 27/84 |
| | | | | 324/216 |
| 6,246,235 | B1 * | 6/2001 | Lowden | G01N 27/84 |
| | | | | 324/216 |
| 2006/0283239 | A1 * | 12/2006 | Leroy | G01G 19/07 |
| | | | | 244/100 R |

FOREIGN PATENT DOCUMENTS

| CN | 112730601 | 4/2021 |
| DE | 2120142 | 11/1972 |
| DE | 19633772 | 2/1998 |
| JP | S60165543 | 8/1985 |
| JP | H7225221 | 8/1995 |
| WO | 03071256 | 8/2003 |
| WO | 2003071256 | 8/2003 |
| WO | 2009123847 | 10/2009 |

OTHER PUBLICATIONS

European Patent Office, European Search Report dated Aug. 29, 2024 in Application No. 24169214.4.

* cited by examiner

*Primary Examiner* — Jas A Sanghera
(74) *Attorney, Agent, or Firm* — SNELL & WILMER L.L.P.

(57) ABSTRACT

A magnetic particle testing mechanism is provided for testing for defects in an axle of a landing gear assembly. The magnetic particle testing mechanism includes a conductor mechanism. The conductor mechanism is configured to apply a magnetic particle substance onto a portion of the axle and generate a magnetic field within or around the portion of the axle. Generating the magnetic field causes a magnetic field distortion associated with a defect in the axle that attracts the magnetic particle substance indicating a location of the defect in the axle.

18 Claims, 7 Drawing Sheets

MAGNETIC PARTICLE TESTING FOR AN AXLE OF AN AIRCRAFT LANDING GEAR

FIELD

The present disclosure relates generally to aircraft landing systems and, more particularly, to magnetic particle testing for an axle of an aircraft landing gear.

BACKGROUND

Landing gear assemblies of an aircraft supports the aircraft during landing and while the aircraft is on the ground. The landing gear may include, among other components, an axle that supports one or more pairs of wheels. Landing gear axles are typically made from high-strength steel, a ferromagnetic material attracting magnets. During the operation of the landing gears, defects may be caused by stress or corrosion on the landing gear surface. Furthermore, machining, drilling, grinding, and plating manufacturing processes may produce defects such as cracks during fabrication. These defects in landing gear may tend to impact aircraft performance.

SUMMARY

Disclosed herein is a magnetic particle testing mechanism for testing for defects in an axle of a landing gear assembly. The magnetic particle testing mechanism includes a conductor mechanism. The conductor mechanism is configured to apply a magnetic particle substance onto a portion of the axle and generate a magnetic field within or around the portion of the axle. Generating the magnetic field causes a magnetic field distortion associated with a defect in the axle that attracts the magnetic particle substance indicating a location of the defect in the axle.

In various embodiments, the conductor mechanism is a central conductor mechanism and wherein the central conductor mechanism is configured to be inserted into a bore of the axle. In various embodiments, the central conductor mechanism is a set of central conductor mechanisms. In various embodiments, a first central conductor mechanism of the set of central conductor mechanisms is configured to be inserted into the bore on a first end of the axle. In various embodiments, a second central conductor mechanism of the set of central conductor mechanisms is configured to be inserted into the bore on a second end of the axle. In various embodiments, the first end of the first central conductor mechanism and a first end of the second central conductor mechanism are configured to couple to each other in a center of the bore of the axle.

In various embodiments, the conductor mechanism is a coiled conductor mechanism and wherein the coiled conductor mechanism is configured to surround an outer perimeter of the axle. In various embodiments, the conductor mechanism is a tube structure with a center void and a plurality of spray nozzles along a length of an outer casing of the tube structure. In various embodiments, the nozzles of the plurality of spray nozzles are positioned around an outer circumference of the outer casing. In various embodiments, the tube structure forms a coil and wherein the plurality of spray nozzles are positioned along an inner circumference of a circle formed by the coil. In various embodiments, each spray nozzle in the plurality of spray nozzles is either a single tip spray nozzle or a multi-tip spray nozzle and wherein the multi-tip spray nozzle includes 2 spray tips and 6 spray tips.

In various embodiments, the magnetic field generated within or around the portion of the axle is provided via a set of electrical connections coupled to either end of the conductor mechanism.

Also disclosed herein is a system for testing for defects in an axle of a landing gear assembly. The system includes a magnetic particle testing mechanism. The magnetic particle testing mechanism includes an axle seat configured to receive the axle and a conductor mechanism. The conductor mechanism is configured to apply a magnetic particle substance onto a portion of the axle and generate a magnetic field within or around the portion of the axle. Generating the magnetic field causes a magnetic field distortion associated with a defect in the axle that attracts the magnetic particle substance indicating a location of the defect in the axle.

In various embodiments, the magnetic particle testing mechanism further includes a head stock. In various embodiments, the conductor mechanism is a central conductor mechanism. In various embodiments, the head stock is configured to support the central conductor mechanism. In various embodiments, the central conductor mechanism is configured to be inserted into a bore of the axle by translating the head stock in a first direction.

In various embodiments, the magnetic particle testing mechanism further includes a tail stock. In various embodiments, the central conductor mechanism is a set of central conductor mechanisms. In various embodiments, the head stock is configured to support a first central conductor mechanism of the set of central conductor mechanisms. In various embodiments, the first central conductor mechanism is configured to be inserted into the bore on a first end of the axle by translating the head stock in the first direction. In various embodiments, the tail stock is configured to support a second central conductor mechanism of the set of central conductor mechanisms. In various embodiments, the second central conductor mechanism is configured to be inserted into the bore on a second end of the axle by translating the tail stock in a second direction opposite the first direction. In various embodiments, the first end of the first central conductor mechanism and a first end of the second central conductor mechanism are configured to couple to each other in a center of the bore of the axle.

In various embodiments, the magnetic particle testing mechanism further includes a first movable member. In various embodiments, the conductor mechanism is a coiled conductor mechanism. In various embodiments, the first movable member is configured to support the coiled conductor mechanism. In various embodiments, the coiled conductor mechanism is configured surround an outer perimeter of the axle. In various embodiments, the magnetic particle testing mechanism further includes a second movable member. In various embodiments, the coiled conductor mechanism is a set of coiled conductor mechanisms. In various embodiments, the first movable member is configured to support a first coiled conductor mechanism in the set of coiled conductor mechanisms. In various embodiments, the first coiled conductor mechanism is configured surround the outer perimeter of the axle and translate in a longitudinal direction from a first end of the axle to substantially a center of the axle. In various embodiments, the second movable member is configured to support a second coiled conductor mechanism in the set of coiled conductor mechanisms. In various embodiments, the second coiled conductor mechanism is configured surround the outer perimeter of the axle and translate in the longitudinal direction from a second end of the axle to substantially the center of the axle.

In various embodiments, the axle seat is configured to swivel about a central axis in a lateral direction of the axle seat of between 0 degrees and 60 degrees. In various embodiments, the axle seat is configured to tilt in a longitudinal direction between 1 and 10 degrees. In various embodiments, the axle seat includes a base post, a crossbar structure coupled to the base post, and a set of "V" support structures coupled to the crossbar structure and configured to support the axle. In various embodiments, the crossbar structure is configured to tilt with respect to the base post in order to tilt the axle. In various embodiments, a first "V" support structure of the set "V" support structures is configured to be positioned lower than a second "V" support structure of the set of "V" support structures in order to tilt the axle.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Further, any steps in a method discussed herein may be performed in any suitable order or combination.

Disclosed herein is magnetic particle testing mechanism for an axle of an aircraft landing gear of an aircraft. Again, landing gear axles are typically made from high-strength steel, a ferromagnetic material attracting magnets. During the operation of the landing gears, defects may be caused by stress or corrosion on the landing gear surface. Furthermore, machining, drilling, grinding, and plating manufacturing processes may produce defects such as cracks during fabrication. These defects in landing gear may tend to impact aircraft performance. Magnetic Particle Inspection (MPI) is a primary Non-Destructive Testing (NDT) method to detect surface or subsurface defects in the landing gear axle material. MPI is widely used to detect metallurgical defects in the landing gear components, and this NDT prevents the defective item from being installed on an aircraft. Particular types of axles for a commercial airplane may weigh up to 190 lb. Such axles are not safe to handle by an inspector's hands and thus, benefit from mechanical assistance, e.g. slings and a lifting device, which may pose potential safety issues and may cause further processing time. In various embodiments, a typical inspection process may include loading an axle into the testing device utilizing a sling and a lifting device, applying a magnetic particle substance, e.g. a magnetic particle suspension oil or a magnetic particle powder, among others, on an inner surface of the axle, magnetizing the axle utilizing the central conductor, inspecting the inner surface of the axle, applying a magnetic particle substance on an outer surface of the axle, magnetizing the axle utilizing a coil, and inspecting the outer surface of the axle.

In that regard, in various embodiments, an improved system for magnetic particle testing for an axle of an aircraft landing gear is provided. In various embodiments, a central conductor mechanism with a suspension spray function is utilized for electric activation to produce magnetic field around the axle. In various embodiments, the central conductor mechanism is passed through the bore of the axle and, responsive to the central conductor mechanism being electrically activated with adequate amperage, a circular magnetic field is created on external and internal surfaces of the axle. In various embodiments, responsive to the circular magnetic field being produced surrounding the axle, a defect in the axle that is oriented perpendicular to this magnetic field direction will cause magnetic field distortion. In various embodiments, the magnetic field distortion produces a N-S magnetic pole. In various embodiments, this magnetic pole attracts the magnetic particle substance provided by the central conductor mechanism and forms an indication of the defect. In various embodiments, this indication may be identified under Ultraviolet A (UVA) light distinctively where fluorescent magnetic particle substance is utilized.

In various embodiments, the axle may also be positioned within a coiled conductor mechanism with a suspension spray function. Responsive to the coiled conductor mechanism being electrically activated with adequate amperage, a longitudinal magnetic field will be produced within, e.g., along the axis, of the axle. In various embodiments, responsive to the longitudinal magnetic field being produced along the axis of the axle, defects oriented perpendicular to this magnetic field direction, i.e., radially, will cause magnetic field distortion. In various embodiments, the magnetic field distortion produces a N-S magnetic pole. In various embodiments, this magnetic pole attracts the magnetic particle substance provided by the coiled conductor mechanism and forms an indication of the defect. In various embodiments, this indication may be identified under Ultraviolet A (UVA) light distinctively where fluorescent magnetic particle substance is utilized.

Figure 1:
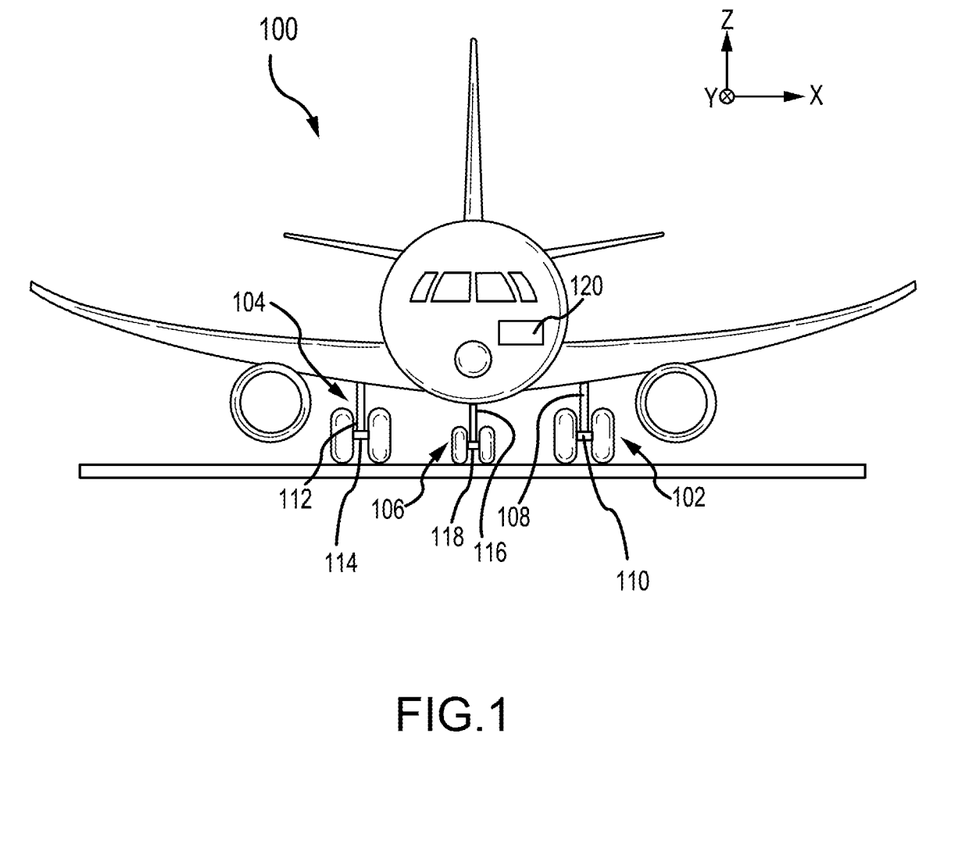
FIG. 1 illustrates an aircraft having left, right and nose landing gear assemblies and wheels mounted thereon, in accordance with various embodiments.

Referring now to FIG. 1, an aircraft 100 is illustrated, in accordance with various embodiments. In accordance with various embodiments, aircraft 100 may include one or more landing gear assemblies, such as, for example, a left landing gear assembly 102 (or port-side landing gear assembly), a right landing gear assembly 104 (or starboard-side landing gear assembly) and a nose landing gear assembly 106. Each of left landing gear assembly 102, right landing gear assembly 104, and nose landing gear assembly 106 may support aircraft 100 when not flying, allowing aircraft 100 to taxi, takeoff, and land safely and without damage to aircraft 100. In various embodiments, left landing gear assembly 102 may include a left shock strut assembly 108 and a left wheel assembly 110, right landing gear assembly 104 may include a right shock strut assembly 112 and a right wheel assembly 114, and nose landing gear assembly 106 may include a nose shock strut assembly 116 and a nose wheel assembly 118.

Figure 2:
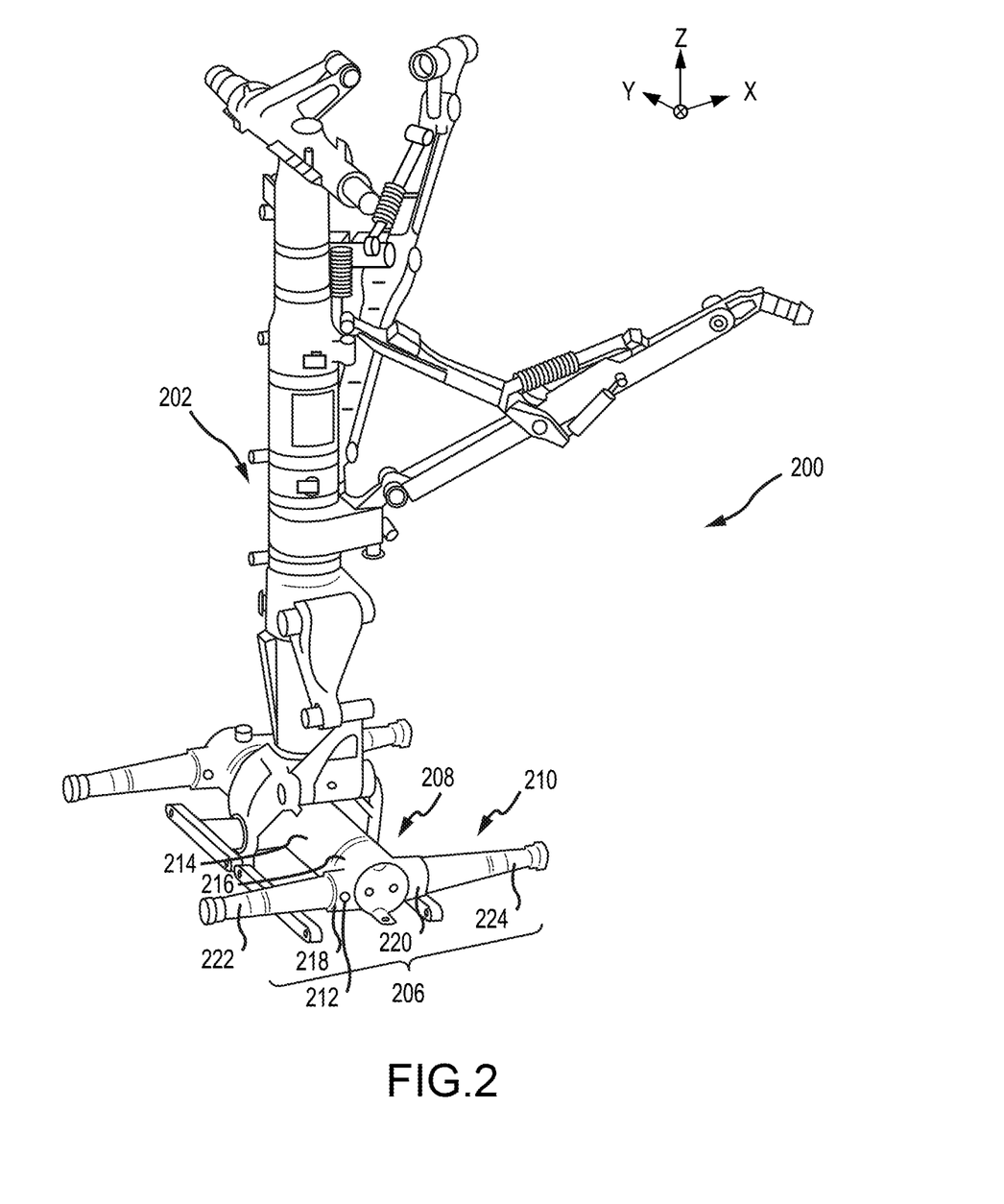
FIG. 2 illustrates an isometric view of an exemplary landing gear assembly, in accordance with various embodiments.

Referring now to FIG. 2, a landing gear 200, such as nose landing gear assembly 106, left wheel assembly 110, or right landing gear assembly 104 of FIG. 1, is illustrated, in accordance with various embodiments. As depicted in FIG. 2, the landing gear 200 for the aircraft, such as aircraft 100 of FIG. 1, generally comprises a shock strut assembly 202 coupled to a bogie beam assembly 206. The bogie beam assembly 206, according to various embodiments, generally comprises a bogie beam 208, an axle 210 for carrying wheels, and at least one retention bolt 212 for directly coupling the axle 210 to the bogie beam 208. FIG. 2 depicts a single retention bolt. It is to be understood that the number of retention bolts may vary from other than depicted and additional retention bolts may be used. The at least one retention bolt 212 may be secured by a nut or the like.

The bogie beam 208 comprises an elongated main body portion 214 having an end portion 216 disposed between a forward sleeve portion 218 and an opposing aft sleeve portion 220 that are transverse to the elongated main body portion 214. The bogie beam 208 according to various embodiments may be generally I-shaped. The forward sleeve portion 218 and the opposing aft sleeve portion 220 each include a bore for receiving the axle 210 as hereinafter described.

The axle 210 extends through the forward sleeve portion 218, the end portion 216, and the opposing aft sleeve portion 220. The axle 210 is configured for carrying at least one pair of wheels of the landing gear 200. The axle 210 extends beyond the forward sleeve portion 218 to define an exposed forward axle portion 222 and beyond the opposing aft sleeve portion 220 to define an exposed aft axle portion 224. An inner surface of the forward sleeve portion 218 and the opposing aft sleeve portion 220 directly contact an outer surface of the axle 210 (i.e., there is no intervening plug and/or axle retention spool between the axle and the bogie beam as in a conventional landing gear and bogie beam assembly). The at least one retention bolt 212 is depicted in FIG. 1 as being secured through the forward sleeve portion 218 and the axle 210.

Figure 3A:
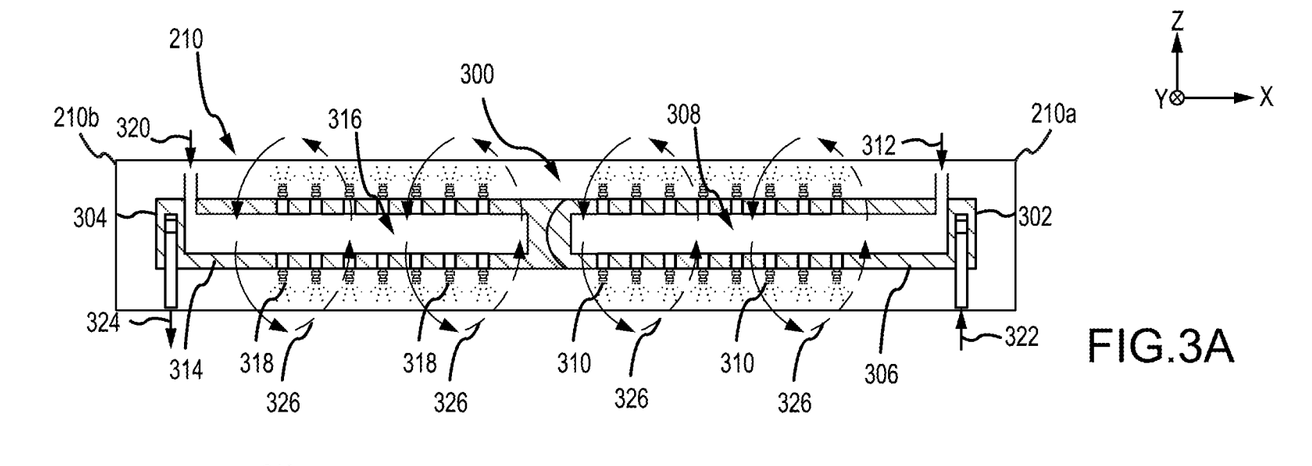
FIGS. 3A and 3B illustrate a central conductor mechanism with a suspension spray function, in accordance with various embodiments.
Figure 3B:
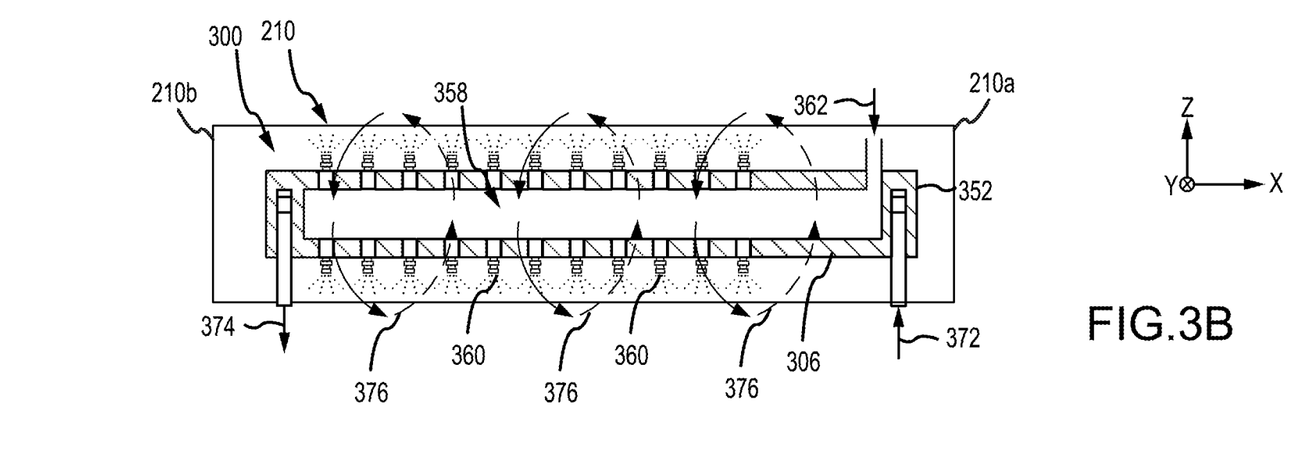

Referring now to FIGS. 3A and 3B, a central conductor mechanism 300 with a suspension spray function is illustrated, in accordance with various embodiments. In various embodiments, the central conductor mechanism 300 is a tube structure. In various embodiments, as shown in FIG. 3A, the central conductor mechanism 300 is a set of conductor mechanisms, e.g. a male tube 302 and a female tube 304. In various embodiments, both the male tube 302 and the female tube 304 are manufactured from a conductive material, e.g. copper, copper alloy, aluminum, or aluminum alloy, among others. In various embodiments, the male tube 302 may be inserted through a first end 210a of axle 210 and the female tube 304 may be inserted through a second end 210b of the axle 210 such that the male tube 302 mates to the female tube 304 at a location substantially in a middle of the axle 210. In various embodiments, by the male tube 302 mating with the female tube 304 at a location substantially in a middle of the axle 210 a high electrical continuity is provided along a length of the interior of the axle 210.

In various embodiments, the male tube 302 is an enclosed tube with an outer casing 306 enclosing a center void 308 along a first direction, i.e. the x-direction. In various embodiments, the male tube 302 includes a plurality of spray nozzles 310 along a length and an outer circumference of the outer casing 306 in the y-direction, the z-direction, and/or a combination of y- and z-directions. In various embodiments, each spray nozzle in the plurality of spray nozzles 310 may be a single tip spray nozzle or a multi-tip spray nozzle. In various embodiments, the multi-tip spray nozzle may have between 2-6 spray tips. In various embodiments, the multi-tip spray nozzle may have between 3-5 spray tips. In various embodiments, the multi-tip spray nozzle may be 4 spray tips. In various embodiments, the center void 308 may be filled with a magnetic particle substance via port 312. In that regard, responsive to the center void 308 being filled with the magnetic particle substance and placed under pressure, the magnetic particle substance is expelled through the plurality of spray nozzles 310 such that the magnetic particle substance coats the interior surface of the axle 210 associated with the male tube 302. In various embodiments, an amount of the magnetic particle substance expelled through the plurality of spray nozzles 310 may be controlled by adjusting nozzle tip size and/or pressure.

Similarly, in various embodiments, the female tube 304 is an enclosed tube with an outer casing 314 enclosing a center void 316 along a first direction, i.e. the x-direction. In various embodiments, the female tube 304 includes a plurality of spray nozzles 318 along a length and an outer circumference of the outer casing 314 in the y-direction, the z-direction, and/or a combination of y- and z-directions. In various embodiments, the center void 316 may be filled with a magnetic particle substance via port 320. In that regard, responsive to the center void 316 being filled with the magnetic particle substance and placed under pressure, the magnetic particle substance is expelled through the plurality of spray nozzles 318 such that the magnetic particle substance coats the interior surface of the axle 210 associated with female tube 304. In various embodiments, an amount of the magnetic particle substance expelled through the plurality of spray nozzles 360 may be controlled by adjusting nozzle tip size and/or pressure.

In various embodiments, a predetermined electric current is passed though the male tube 302 and the female tube 304 via electrical connections 322 and 324. In various embodiments, the electric current may be between 500 amps and 2500 amps. In various embodiments, the electric current may be between 750 amps and 2250 amps. In various embodiments, the electric current may be between 1000 amps and 2000 amps. In various embodiments, the electric current may be an alternating current (AC), full wave direct current (FWDC), or a half wave direct current (HWDC). In various embodiment, the electric voltage at which the electric current is applied may be between 2 volts and 20 volts. In various embodiment, the electric voltage at which the electric current is applied may be between 3 volts and 10 volts. In various embodiment, the electric voltage at which the electric current is applied may be between 4 volts and 7 volts. In various embodiments, by passing the electric current through the male tube 302 and the female tube 304 via the electrical connections 322 and 324, a circular magnetic field 326 is generated around the axle 210. In that regard, by passing the electric current through the male tube 302 and the female tube 304, which are in the bore of the axle 210, the circular magnetic field 326 is generated on the external and internal surfaces of the axle 210 due to the ferromagnetic material of which the axle 210 is comprised.

In various embodiments, in response to the circular magnetic field 326 is generated surrounding the axle 210, defects that are oriented perpendicular to a direction of the circular magnetic field 326 cause a magnetic field distortion, which produces a North-South (N-S) magnetic pole. In that regard, the N-S magnetic pole attracts magnetic powders and/or suspension in magnetic particle substance and forms an indication of a location of the defects. In various embodiments, such defects may be distinctively visualized under an Ultraviolet A (UV-A) light very a fluorescent magnetic particle substance is used. Accordingly, in various embodiments, after the circular magnetic field 326 has been generated for a predetermined time period, the male tube 302 and the female tube 304 are removed from the axle 210 and an inspection of the interior of the axle 210 for defects may be performed under UV-A light.

In various embodiments, for shorter axles, as shown in FIG. 3B, the central conductor mechanism 300 is a single conductor mechanism, a tube 352. In various embodiments, the tube 352 is manufactured from a conductive material, e.g. copper, copper alloy, aluminum, or aluminum alloy, among others. In various embodiments, the tube 352 may be inserted through a first end 210*a* of axle 210 or a second end 210*b* of the axle 210.

In various embodiments, the tube 352 is an enclosed tube with an outer casing 356 enclosing a center void 358 along a first direction, i.e. the x-direction. In various embodiments, the tube 352 includes a plurality of spray nozzles 360 along a length and an outer circumference of the outer casing 356 in the y-direction, the z-direction, and/or a combination of y- and z-directions. In various embodiments, each spray nozzle in the plurality of spray nozzles 360 may be a single tip spray nozzle or a multi-tip spray nozzle. In various embodiments, the multi-tip spray nozzle may have between 2-6 spray tips. In various embodiments, the multi-tip spray nozzle may have between 3-5 spray tips. In various embodiments, the multi-tip spray nozzle may be 4 spray tips. In various embodiments, the center void 358 may be filled with a magnetic particle substance via port 362. In that regard, responsive to the center void 358 being filled with the magnetic particle substance and placed under pressure, the magnetic particle substance is expelled through the plurality of spray nozzles 360 such that the magnetic particle substance coats the interior surface of the axle 210 associated with the tube 352. In various embodiments, an amount of the magnetic particle substance expelled through the plurality of spray nozzles 360 may be controlled by adjusting nozzle tip size and/or pressure.

In various embodiments, an electric current is passed though the tube 352 via electrical connections 372 and 374. In various embodiments, the electric current may be between 500 amps and 2500 amps. In various embodiments, the electric current may be between 750 amps and 2250 amps. In various embodiments, the electric current may be between 1000 amps and 2000 amps. In various embodiments, the electric current may be an alternating current (AC), full wave direct current (FWDC), or a half wave direct current (HWDC). In various embodiment, the electric voltage at which the electric current is applied may be between 2 volts and 20 volts. In various embodiment, the electric voltage at which the electric current is applied may be between 3 volts and 10 volts. In various embodiment, the electric voltage at which the electric current is applied may be between 4 volts and 7 volts. In various embodiments, by passing the electric current through the tube 352 via the electrical connections 372 and 374, a circular magnetic field 376 is generated around the axle 210. In that regard, by passing the electric current through the tube 352, which is in the bore of the axle 210, the circular magnetic field 376 is generated on the external and internal surfaces of the axle 210 because of the ferromagnetic material of which the axle 210 is comprised.

In various embodiments, when the circular magnetic field 376 is generated surrounding the axle 210, defects that are oriented perpendicular to a direction of the circular magnetic field 376 cause a magnetic field distortion, which produces a North-South (N-S) magnetic pole. In that regard, the N-S magnetic pole attracts magnetic powders and/or suspension in magnetic particle substance and forms an indication of a location of the defects. In various embodiments, such defects may be distinctively visualized under an Ultraviolet A (UV-A) light where a fluorescent magnetic particle substance is used. Accordingly, in various embodiments, after the circular magnetic field 376 has been generated for a predetermined time period, the tube 352 is removed from the axle 210 and an inspection of the interior of the axle 210 for defects may be performed under UV-A light.

Figure 4A:
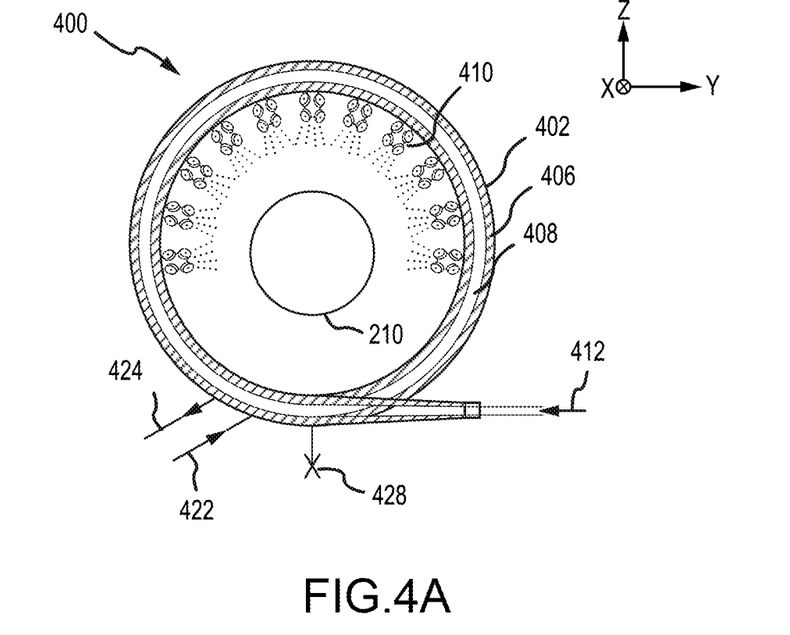
FIGS. 4A and 4B illustrate a coiled conductor mechanism with a suspension spray function, in accordance with various embodiments.
Figure 4B:
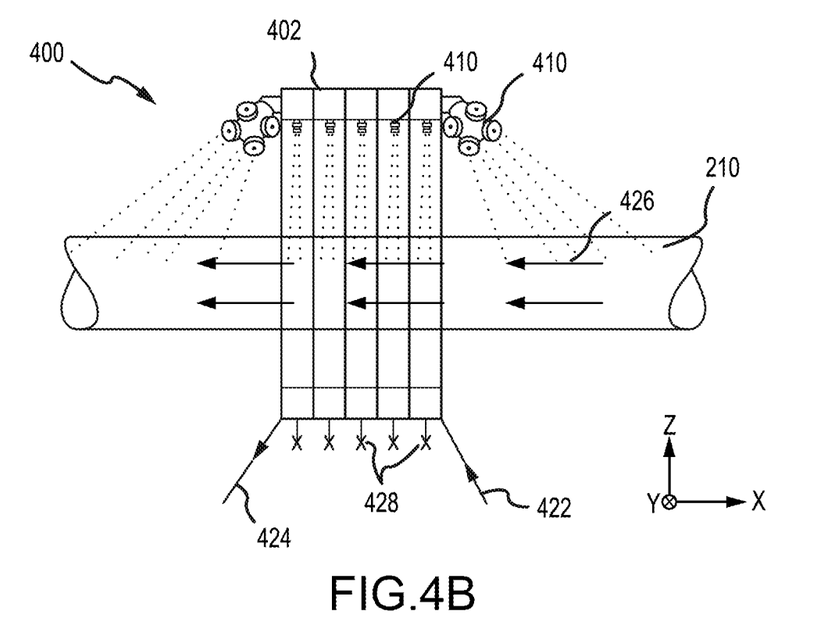

Referring now to FIGS. 4A and 4B, a coiled conductor mechanism 400 with a suspension spray function is illustrated, in accordance with various embodiments. In various embodiments, the coiled conductor mechanism 400 is a tube structure. In various embodiments, as shown in FIGS. 4 and 4B, the coiled conductor mechanism 400 is a coiled tube 402 including a set of coils. In various embodiments, both the coiled tube 402 is manufactured from a conductive material, e.g. copper, copper alloy, aluminum, or aluminum alloy, among others. In various embodiments, the number of coils may be between 1 and 7 coils. In various embodiments, the number of coils may be between 2 and 6 coils. In various embodiments, the number of coils may be between 3 and 5 coils. In various embodiments, the coiled tube 402 may be positioned around an outer perimeter of the axle 210.

In various embodiments, the coiled tube 402 is an enclosed tube with an outer casing 406 enclosing a center void 408 along a length of the coiled tube 402. In various embodiments, the coiled tube 402 is coiled forming substantially a circle with an inner circumference. In various embodiments, the coiled tube 402 includes a plurality of spray nozzles 410 along a length of the outer casing 406 along the inner circumference of the formed circle in the y-direction, the z-direction, and/or a combination of y- and z-directions facing the axle 210. In various embodiments, each spray nozzle in the plurality of spray nozzles 410 may be a single tip spray nozzle or a multi-tip spray nozzle. In various embodiments, the multi-tip spray nozzle may have between 2-6 spray tips. In various embodiments, the multi-tip spray nozzle may have between 3-5 spray tips. In various embodiments, the multi-tip spray nozzle may be 4 spray tips. In various embodiments, the center void 408 may be filled with a magnetic particle substance via port 412. In that regard, responsive to the center void 408 being filled with the magnetic particle substance and placed under pressure, the magnetic particle substance is expelled through the plurality of spray nozzles 410 such that the magnetic particle substance coats the outer surface of the axle 210 associated with the coiled tube 402. In various embodiments, an amount of the magnetic particle substance expelled through the plurality of spray nozzles 410 may be controlled by adjusting nozzle tip size and/or pressure.

In various embodiments, an electric current is passed though the coiled tube 402 via electrical connections 422 and 424. In various embodiments, the electric current may be between 500 amps and 3000 amps. In various embodiments, the electric current may be between 1000 amps and 2500 amps. In various embodiments, the electric current may be between 1500 amps and 2000 amps. In various embodiments, the amperes may vary depending on the number of turns in the coiled tube 402. In that regard, a larger number of turns may require lower amperes and a fewer number of turns may require higher amperes. In various embodiments, the electric current may be an alternating current (AC), full wave direct current (FWDC), or a half wave direct current (HWDC). In various embodiment, the electric voltage at which the electric current is applied may be between 2 volts and 20 volts. In various embodiment, the electric voltage at which the electric current is applied may be between 3 volts and 10 volts. In various embodiment, the electric voltage at which the electric current is applied may be between 4 volts and 7 volts. In various embodiments, by passing the electric current through the coiled tube 402 via the electrical connections 422 and 424, a longitudinal magnetic field 426 is generated through, i.e. in a x-direction, the axle 210. In that regard, by passing the electric current through the coiled tube 402, the longitudinal magnetic field 426 is generated longitudinally on the external and internal surfaces of the axle 210 due to the ferromagnetic material of which the axle 210 is comprised.

In various embodiments, when the longitudinal magnetic field 426 is generated surrounding the axle 210, any defects that are oriented perpendicular to a direction of the longitudinal magnetic field 426 causes a magnetic field distortion, which produces a North-South (N-S) magnetic pole. In that regard, the N-S magnetic pole attracts magnetic powders and/or suspension in magnetic particle substance and forms an indication of a location of the defects. In various embodiments, such defects may be distinctively visualized under an Ultraviolet A (UV-A) light where a fluorescent magnetic particle substance is used. Accordingly, in various embodiments, after the longitudinal magnetic field 426 has been generated for a predetermined time period, the coiled tube 402 is removed from around the axle 210 and an inspection of the exterior of the axle 210 for defects may be performed under UV-A light. In various embodiments, drain valves 428 may be configured to at least partially drain remaining magnetic particle substance in the coiled tube 402.

Figure 5:
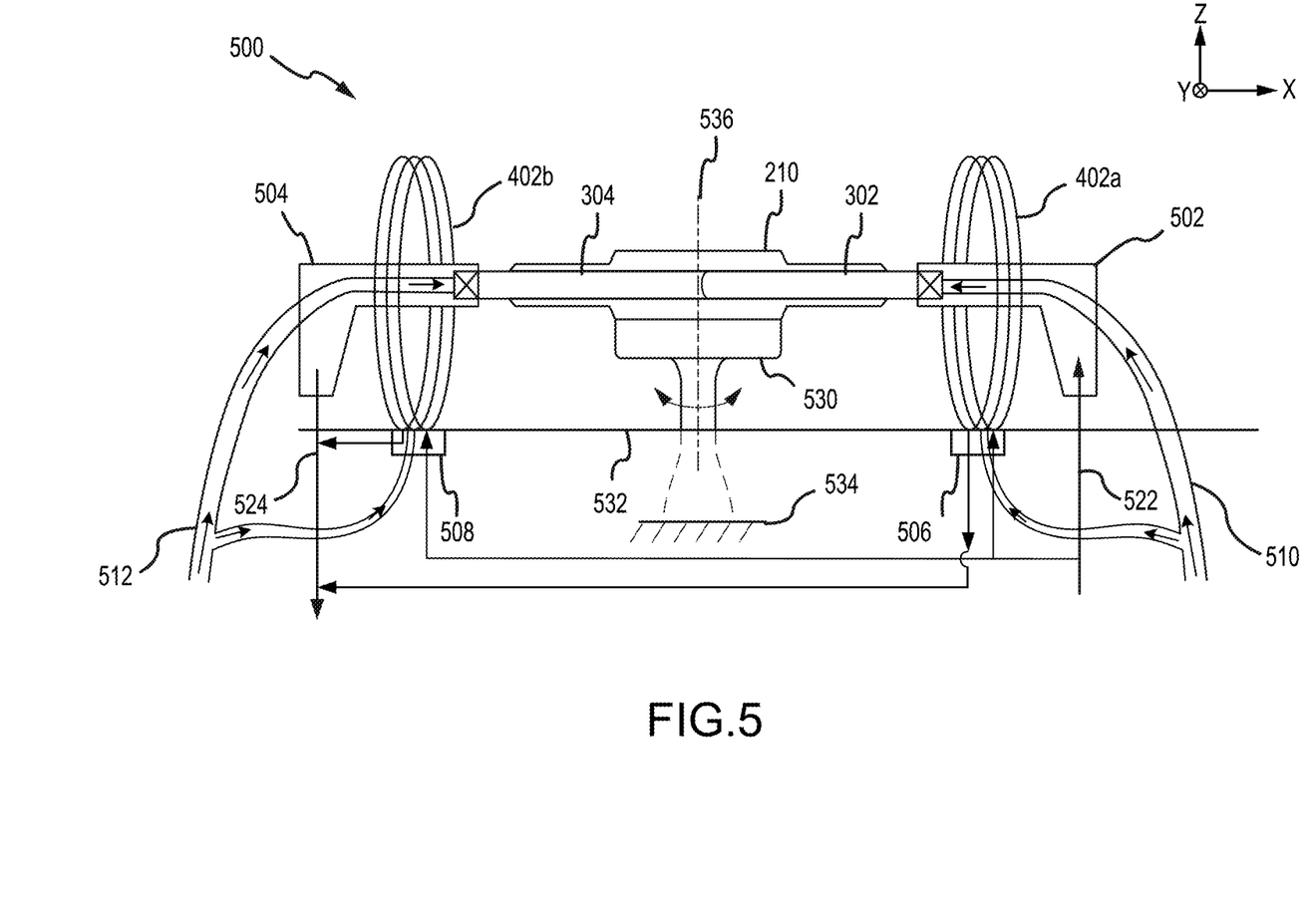
FIG. 5 illustrates a system for magnetic particle testing of an axle of an aircraft landing gear, in accordance with various embodiments.

Referring now to FIG. 5, a system for magnetic particle testing of an axle of an aircraft landing gear is illustrated, in accordance with various embodiments. In various embodiments, the system 500 includes a set of central conductor mechanisms, such as the male tube 302 and the female tube 304 of FIG. 3A. In various embodiments, the system 500 comprises a head stock 502 and a tail stock 504, which are structural members configured to couple to and support the male tube 302 and the female tube 304, respectively. In various embodiments, the head stock 502 and the tail stock 504 are configured to traverse in a longitudinal direction, i.e. in the x-direction, in order to insert and extract the male tube 302 and the female tube 304 into and out of the bore of the axle 210. In various embodiments, a movement of the head stock 502 and the tail stock 504 may be manually controlled or mechanically controller, e.g. thorough pneumatic mechanisms, electrical mechanisms, among others.

In various embodiments, the system 500 further includes a set of coiled conductor mechanisms, i.e. coiled tube 402a and coiled tube 402b, such as coiled tube 402 of FIGS. 4A and 4B. In various embodiments, the system 500 comprises a first movable member 506 and a second movable member 508, which are structural members configured to couple to and support the coiled tube 402a and the coiled tube 402b, respectively. In various embodiments, the first movable member 506 and the second movable member 508 are configured to traverse in a longitudinal direction, i.e. in the x-direction, in order to move the coiled tube 402a and the coiled tube 402b from at least an end of the axle 210 to substantially a center of the axle 210. In various embodiments, a movement of a first movable member 506 and a second movable member 508 may be manually controlled or mechanically controller, e.g. thorough pneumatic mechanisms, electrical mechanisms, among others.

In various embodiments, the male tube 302 and the coiled tube 402a may receive a magnetic particle substance via magnetic particle substance feed line 510. In various embodiments, the magnetic particle substance feed line 510 may comprise a set of valves to allow differentiated control of the magnetic particle substance to a selective one of the male tube 302 or the coiled tube 402a. In various embodiments, the female tube 304 and the coiled tube 402b may receive the magnetic particle substance via magnetic particle substance feed line 512. In various embodiments, the magnetic particle substance feed line 512 may comprise a set of valves to allow differentiated control of the magnetic particle substance to a selective one of the female tube 304 or the coiled tube 402b. In various embodiments, the magnetic particle substance feed line 510 and the magnetic particle substance feed line 512 may be a same magnetic particle substance feed line.

In various embodiments, an electric current may be passed though the male tube 302 and the female tube 304 via electrical connections 522 and 524. In various embodiments, by passing the electric current through the male tube 302 and the female tube 304 via the electrical connections 522 and 524, a circular magnetic field, shown in FIG. 3, is generated around the axle 210. In various embodiments, an electric current may be passed though the coiled tube 402a and the coiled tube 402b via electrical connections 522 and 524. In various embodiments, by passing the electric current through the coiled tube 402a and coiled tube 402b via the electrical connections 522 and 524, a longitudinal magnetic field, shown in FIGS. 4A and 4B, is generated through, i.e. in a x-direction, the axle 210.

In various embodiments, the axle 210 may be positioned on axle seat 530. In various embodiments, the axle seat 530 is positioned between the head stock 502 and the tail stock 504. In various embodiments, the coiled tube 402a and coiled tube 402b are positioned between the head stock 502 and the tail stock 504 on each side of the axle seat 530. In various embodiments, the axle seat 503 may be a support member that coupled to a table structure 532. In various embodiments, the axle seat 503 may be a support structure that is supported below the table structure 532 and protrudes through the table structure 532. In various embodiments, the axle seat 530 is electrically grounded via ground 534.

In various embodiments, the axle seat 530 may swivel between 0 degrees and 60 degrees about a central axis 536 in a lateral direction, i.e. in a z-direction. In various embodiments, the axle seat 530 may swivel between 0 degrees and 50 degrees about a central axis 536. i.e. in a z-direction. In various embodiments, the axle seat 530 may swivel between 0 degrees and 45 degrees about a central axis 536. i.e. in a z-direction. In various embodiments, the axle seat 530 may swivel in a clockwise and/or counterclockwise direction about a central axis 536. i.e. in a z-direction. In that regard, the axle seat 530 swiveling in a clockwise and/or counterclockwise direction about a central axis 536 provides space to inspect the interior surface and/or the exterior surface of the axle 210.

Figure 6A:
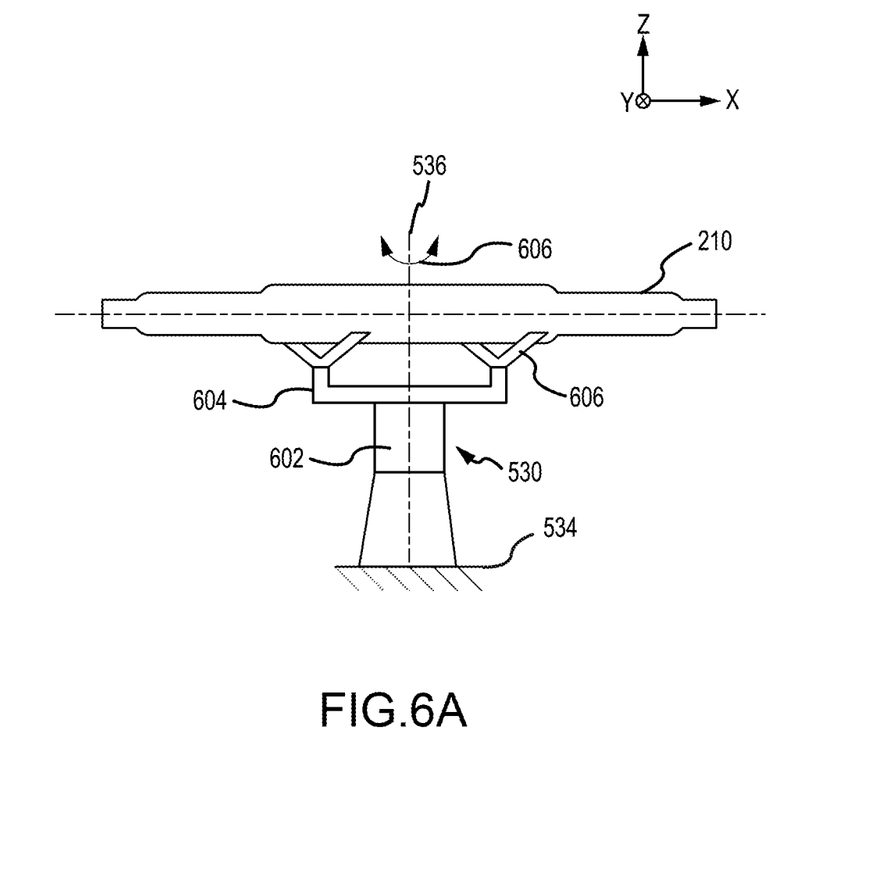
FIG. 6A illustrates components of an axle seat, in accordance with various embodiments.

With temporary reference to FIG. 6A, components of an axle seat are illustrated, in accordance with various embodiments. In various embodiments, the axle seat 530 includes a base post 602, a crossbar structure 604, and a set of "V" support structures 606. In various embodiments, a lower portion, in a z-direction, of the base post 602 is electrically grounded via ground 534. In various embodiments, an upper position, in a z-direction of the base post 602 is coupled to the crossbar structure 604. In various embodiments, a center, in an x-direction, of the crossbar structure 604 aligns with the central axis 536 of the base post 602. In various embodiments, one of each of the "V" support structures 606 is coupled to either end of the crossbar structure 604. In various embodiments, the axle seat 530 is configured to swivel about the central axis 536 of the base post 602.

Figure 6B:
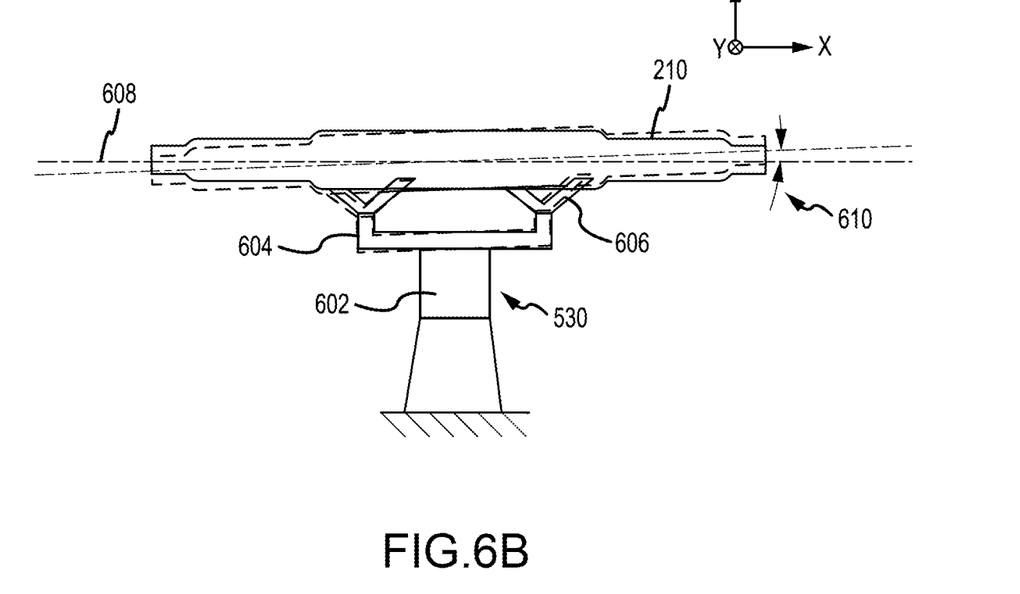
FIG. 6B illustrates a tilt or taper function of an axle seat, in accordance with various embodiments.

With temporary reference to FIG. 6B, a tilt or taper function of an axle seat is illustrated, in accordance with various embodiments. In various embodiments, the axle seat 530 is configured to tilt or be tapered in a longitudinal direction, i.e. about a y-axis. In that regard, in various embodiments, the crossbar structure 604 may tilt with respect to the base post 602. In various embodiments, one of the "V" support structures 606 may be positioned lower than the other one of the "V" support structures 606. In various embodiments, the tilt or taper 610 of the axle seat 530 may be between 1 and 10 degrees from a centerline 608. In various embodiments, the tilt or taper 610 of the axle seat 530 may be between 1 and 8 degrees from the centerline 608. In various embodiments, the tilt or taper 610 of the axle seat 530 may be between 1 and 5 degrees from the centerline 608. In various embodiments, the tilt or taper 610 of the axle seat 530 provides for at least partially draining any remaining magnetic particle substance from the inside of the axle 210.

Figure 6C:
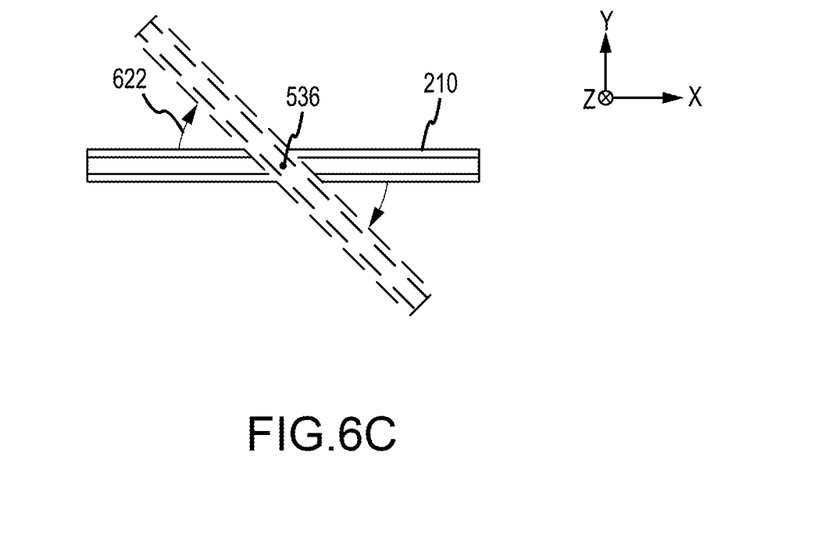
FIG. 6C illustrates a swivel function of an axle seat, in accordance with various embodiments.

With temporary reference to FIG. 6C, a swivel function of an axle seat is illustrated, in accordance with various embodiments. In various embodiments, the axle seat 530, which is below the axle 210 in FIG. 6C and thus not shown, may swivel at angle 622 between 0 degrees and 60 degrees about a central axis 536. i.e. in a z-direction. In various embodiments, the axle seat 530 may swivel at angle 622 between 0 degrees and 50 degrees about a central axis 536, i.e., in a rotation is in xy plane, and angle 622 is angle from x axis to axle 210. In various embodiments, the axle seat 530 may swivel at angle 622 between 0 degrees and 45 degrees about a central axis 536, i.e., in a rotation is in xy plane, and angle 622 is angle from x axis to axle 210. In various embodiments, the axle seat 530 may swivel at angle 622 in a clockwise and/or counterclockwise direction about a central axis 536, i.e., in a rotation is in xy plane, and angle 622 is angle from x axis to axle 210. In that regard, the axle seat 530 swiveling in a clockwise and/or counterclockwise direction about a central axis 536 provides space to inspect the interior surface and/or the exterior surface of the axle 210.

Accordingly, in various embodiments, an improved system for magnetic particle testing for an axle of an aircraft landing gear is provided. In various embodiments, a central conductor mechanism and/or a coiled conductor mechanism with a suspension spray function is/are utilized for electric activation to produce magnetic field around or within the axle. In various embodiments, the central conductor mechanism is passed through the bore of the axle and/or the axle may also be positioned within a coiled conductor mechanism. Responsive to an electric current being provided with suitable amperage, a magnetic field is created on external and internal surfaces of the axle. In various embodiments, responsive to the magnetic field being produced, defects in the axle cause magnetic field distortion. In various embodiments, the magnetic field distortion produces a N-S magnetic pole. In various embodiments, this magnetic pole attracts the magnetic particle substance and forms an indication of the defect. In various embodiments, this indication may be identified under Ultraviolet A (UVA) light very distinctively when a fluorescent magnetic particle substance is utilized.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C. B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A magnetic particle testing mechanism for testing for defects in an axle of a landing gear assembly, comprising:
a conductor mechanism, wherein the conductor mechanism is configured to:
apply a magnetic particle substance onto a portion of the axle; and
generate a magnetic field within or around the portion of the axle,
wherein generating the magnetic field causes a magnetic field distortion associated with a defect in the axle that attracts the magnetic particle substance indicating a location of the defect in the axle and wherein the conductor mechanism is a tube structure with a center void and a plurality of spray nozzles along a length of an outer casing of the tube structure.

2. The magnetic particle testing mechanism of claim 1, wherein the conductor mechanism is a central conductor mechanism and wherein the central conductor mechanism is configured to be inserted into a bore of the axle.

3. The magnetic particle testing mechanism of claim 2, wherein the central conductor mechanism is a set of central conductor mechanisms,
wherein a first central conductor mechanism of the set of central conductor mechanisms is configured to be inserted into the bore on a first end of the axle,
wherein a second central conductor mechanism of the set of central conductor mechanisms is configured to be inserted into the bore on a second end of the axle, and
wherein a first end of the first central conductor mechanism and a first end of the second central conductor mechanism are configured to couple to each other in a center of the bore of the axle.

4. The magnetic particle testing mechanism of claim 1, wherein the conductor mechanism is a coiled conductor mechanism and wherein the coiled conductor mechanism is configured to surround an outer perimeter of the axle.

5. The magnetic particle testing mechanism of claim 1, wherein the nozzles of the plurality of spray nozzles are positioned around an outer circumference of the outer casing.

6. The magnetic particle testing mechanism of claim 1, wherein the tube structure forms a coil and wherein the plurality of spray nozzles are positioned along an inner circumference of a circle formed by the coil.

7. The magnetic particle testing mechanism of claim 1, wherein each spray nozzle in the plurality of spray nozzles is either a single tip spray nozzle or a multi-tip spray nozzle and wherein the multi-tip spray nozzle includes between 2 spray tips and 6 spray tips.

8. The magnetic particle testing mechanism of claim 1, wherein the magnetic field generated within or around the portion of the axle is provided via a set of electrical connections coupled to either end of the conductor mechanism.

9. The magnetic particle testing mechanism of claim 1, wherein the magnetic field generated within or around the portion of the axle is via an electric current.

10. A system for testing for defects in an axle of a landing gear assembly, comprising:
a magnetic particle testing mechanism, the magnetic particle testing mechanism comprising:
an axle seat configured to receive the axle, wherein the axle seat comprises:
a base post;
a crossbar structure coupled to the base post; and
a set of "V" support structures coupled to the crossbar structure and configured to support the axle; and
a conductor mechanism, wherein the conductor mechanism is configured to:
apply a magnetic particle substance onto a portion of the axle; and
generate a magnetic field within or around the portion of the axle,
wherein generating the magnetic field causes a magnetic field distortion associated with a defect in the axle that attracts the magnetic particle substance indicating a location of the defect in the axle.

11. The system of claim 10, wherein the magnetic particle testing mechanism further comprises:
a head stock,
wherein the conductor mechanism is a central conductor mechanism,
wherein the head stock is configured to support the central conductor mechanism, and
wherein the central conductor mechanism is configured to be inserted into a bore of the axle by translating the head stock in a first direction.

12. The system of claim 11, wherein the magnetic particle testing mechanism further comprises:
a tail stock,
wherein the central conductor mechanism is a set of central conductor mechanisms,
wherein the head stock is configured to support a first central conductor mechanism of the set of central conductor mechanisms,
wherein the first central conductor mechanism is configured to be inserted into the bore on a first end of the axle by translating the head stock in the first direction,
wherein the tail stock is configured to support a second central conductor mechanism of the set of central conductor mechanisms,
wherein the second central conductor mechanism is configured to be inserted into the bore on a second end of the axle by translating the tail stock in a second direction opposite the first direction, and
wherein a first end of the first central conductor mechanism and a first end of the second central conductor mechanism are configured to couple to each other in a center of the bore of the axle.

13. The system of claim 10, wherein the magnetic particle testing mechanism further comprises:
a first movable member,
wherein the conductor mechanism is a coiled conductor mechanism,
wherein the first movable member is configured to support the coiled conductor mechanism, and
wherein the coiled conductor mechanism is configured surround an outer perimeter of the axle.

14. The system of claim 13, wherein the magnetic particle testing mechanism further comprises:
a second movable member,
wherein the coiled conductor mechanism is a set of coiled conductor mechanisms,
wherein the first movable member is configured to support a first coiled conductor mechanism in the set of coiled conductor mechanisms,
wherein the first coiled conductor mechanism is configured surround the outer perimeter of the axle and translate in a longitudinal direction from a first end of the axle to substantially a center of the axle, wherein the second movable member is configured to support a second coiled conductor mechanism in the set of coiled conductor mechanisms, and wherein the second coiled conductor mechanism is configured surround the outer perimeter of the axle and translate in the longitudinal direction from a second end of the axle to substantially the center of the axle.

15. The system of claim 10, wherein the axle seat is configured to swivel about a central axis in a lateral direction of the axle seat of between 0 degrees and 60 degrees.

16. The system of claim 10, wherein the axle seat is configured to tilt in a longitudinal direction between 1 and 10 degrees.

17. The system of claim 10, wherein the crossbar structure is configured to tilt with respect to the base post in order to tilt the axle.

18. The system of claim 17, wherein a first "V" support structure of the set "V" support structures is configured to be positioned lower than a second "V" support structure of the set of "V" support structures in order to tilt the axle.

* * * * *